May 24, 1932.    S. J. VELTON    1,859,687
INTERNAL COMBUSTION ENGINE
Filed Jan. 31, 1931    3 Sheets-Sheet 3

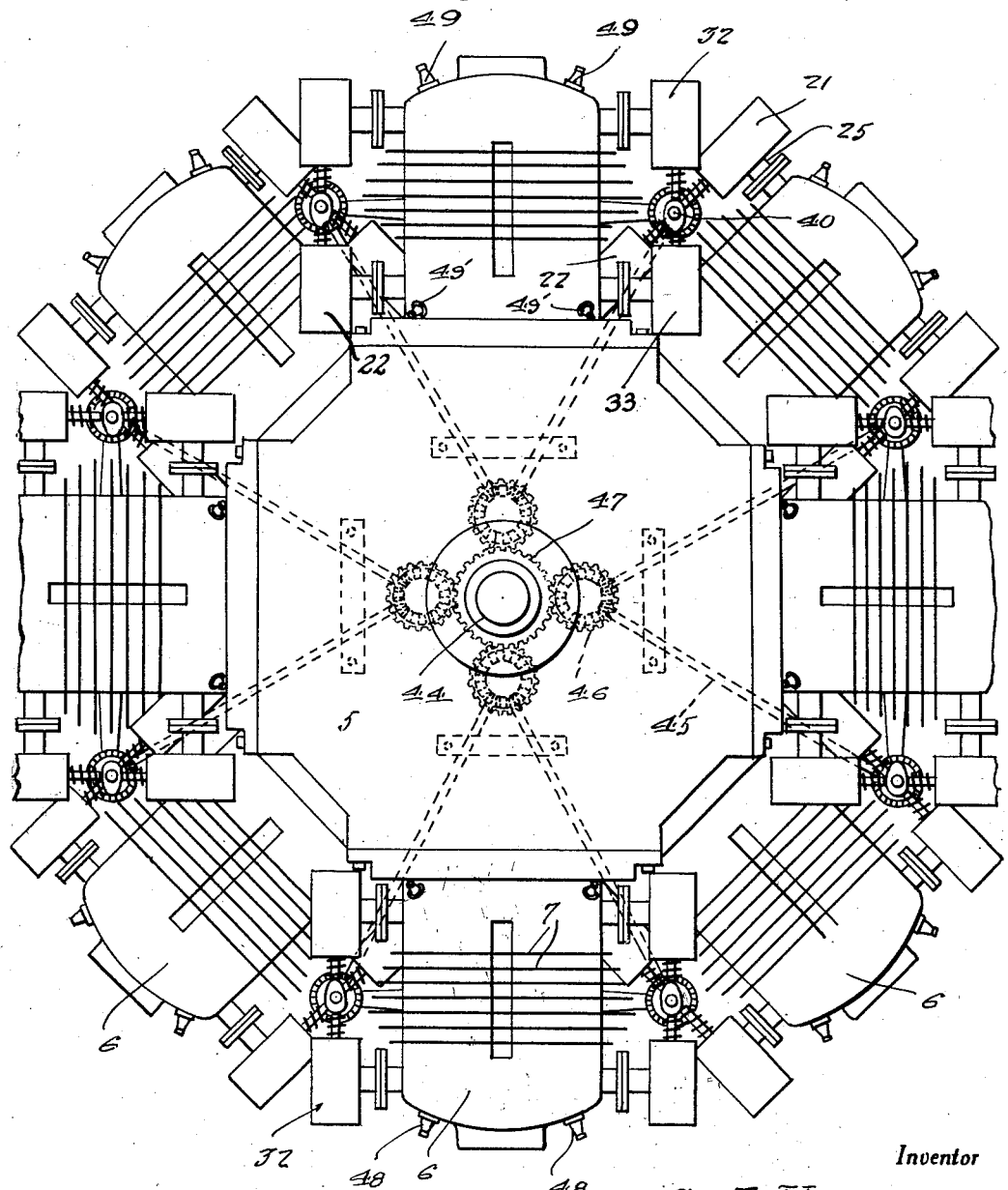

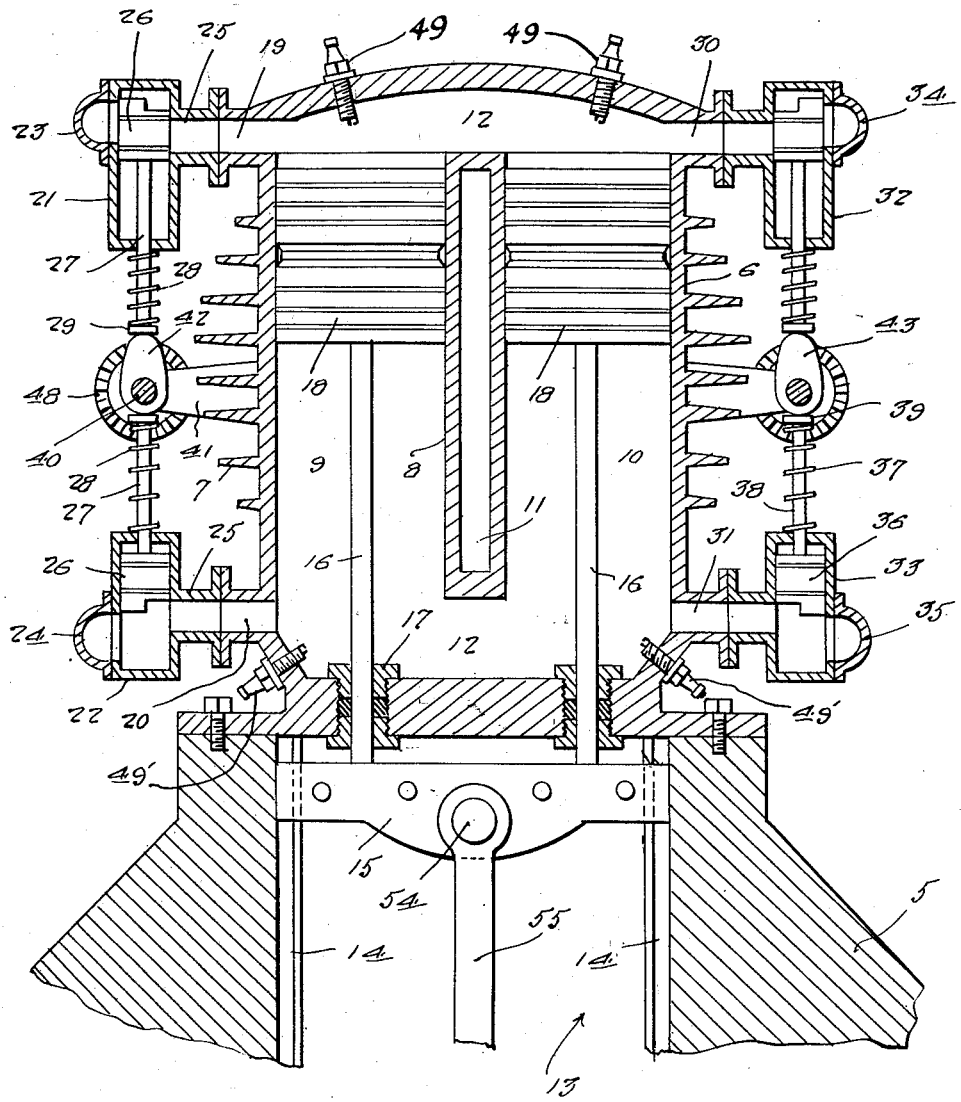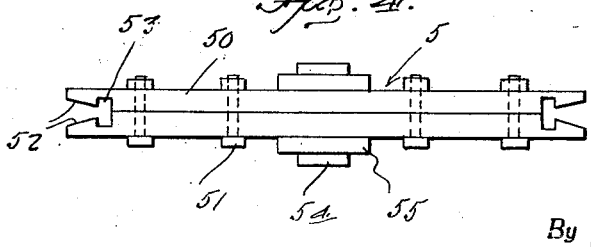

Inventor
S. J. Velton

By Clarence A. O'Brien
Attorney

Patented May 24, 1932

1,859,687

UNITED STATES PATENT OFFICE

STEPHEN J. VELTON, OF HOUSTON, TEXAS

INTERNAL COMBUSTION ENGINE

Application filed January 31, 1931. Serial No. 512,676.

This invention relates to improvements in internal combustion engines and the primary object of the present invention is to generally improve and simplify the construction of engines of the double acting radial type.

A still further object of the invention is to provide a radial, double acting type of internal combustion engine that is especially adapted for use on aeroplanes.

With these and other objects in view, the invention consists in the novel construction, arrangement and formation of parts as will be hereinafter specifically described, claimed and illustrated in the accompanying drawings, wherein:

Figure 1 is an elevational view of the internal combustion engine.

Figure 2 is a fragmentary sectional elevational view therethrough.

Fig. 4 is a detailed top view of the crosshead.

Figure 3:
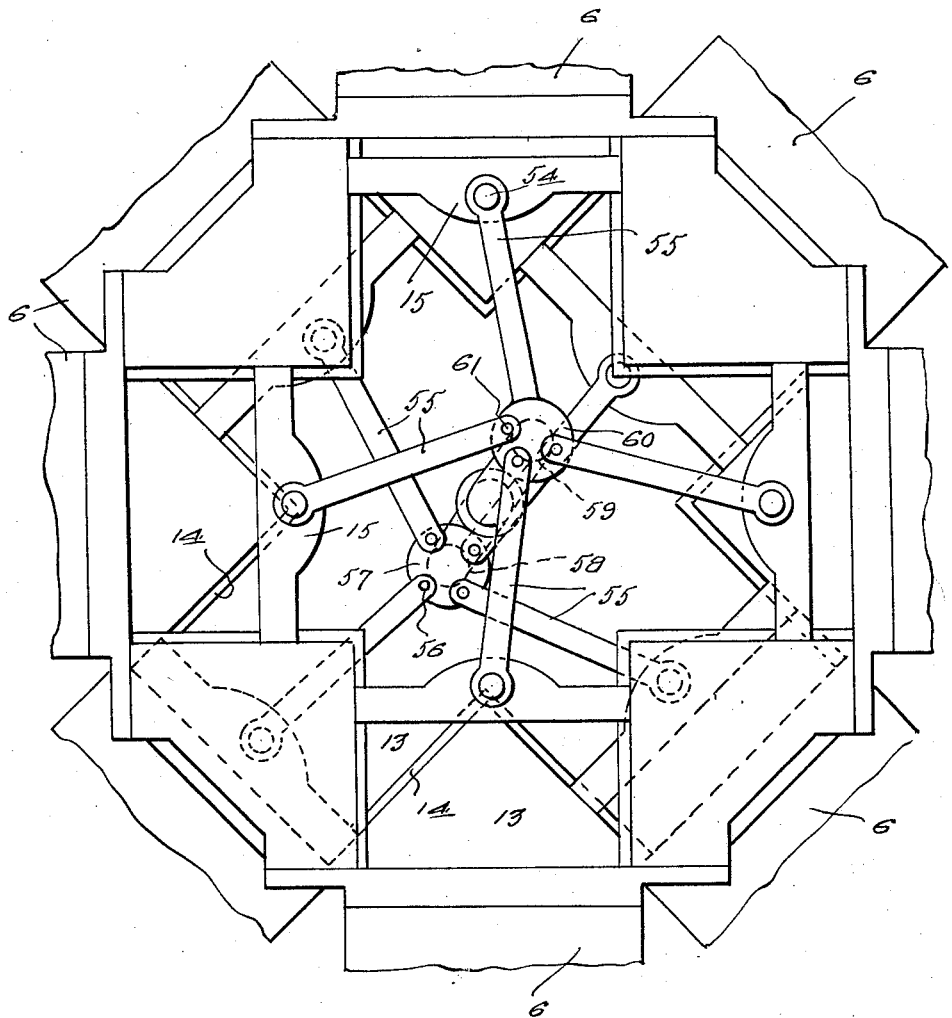
Figure 3 is a fragmentary plan view with the cover plate removed for showing the drive means for the piston.

With reference more in detail to the drawings, it will be seen that the internal combustion engine as comprehended by the present invention, includes a main casing 5 having projecting radially therefrom a somewhat annular series of cylinders 6, there being preferably eight of such cylinders although more or less could be used as found desirable. Each of the cylinders 6 is provided exteriorly with the usual cooling fins 7.

Each cylinder 6 is of relatively large diameter, and is divided by a partition 8 into a pair of cylinder chambers 9 and 10 respectively, partition 8 terminates in spaced relation to the top and bottom of the cylinder, and the partition is of hollow construction to provide a water jacket 11.

The cylinder 6 at opposite ends thereof is provided with combustion chambers 12 common to the cylinder chambers 9 and 10.

Adjacent each cylinder 6, the casing 5 is provided with a radial guide channel 13 opposite walls of which are provided with ribs 14 to provide guides for a cross head 15 adapted for reciprocation within the channel 13.

A pair of piston rods 16 are connected to the cross head 15 and extend through glands 17 provided in the inner or bottom wall of the cylinder, and are connected at their upper ends with pistons 18 reciprocably mounted in the bores of the cylinder chambers 9 and 10.

The opposite extremities of each cylinder 6 are formed in one side wall thereof with intake ports 19, 20. Intake ports 19 and 20 are controlled by intake valves 21 and 22 interposed between the ports and intake manifolds 23, 24.

Each of the valves 21, 22 include a cylindrical casing having an outlet nipple 25 suitably fastened at its end to the cylinder in registry with the intake ports. Offset with respect to the outlet 25, each valve casing is provided with an intake port affording communication between the valve casing and its respective intake manifold 23, 24. Mounted for reciprocation in each valve casing is a solid valve piston 26 provided with a piston rod 27, about which exteriorly of the valve casing, is convoluted a spring 28, one end of which spring bears against an adjacent end of the valve casing, the other end of the spring bearing against a head 29 on the free end of the piston rod. The mechanism for controlling the intake valves 21, 22 will be hereinafter referred to in detail.

At its opposite extremities, and on the opposite side wall thereof each cylinder 6 is provided with exhaust ports 30 and 31 controlled by exhaust valves 32, 33 interposed between the exhaust ports 30, 31 and exhaust manifolds 34, 35.

The valves 32, 33 are substantially similar in every detail to the valves 21, 22 and respectively include a cylindrical casing provided with an outlet nipple, an intake port, a piston 36 urged in one direction by a spring 37 convoluted about the piston rod 38 and bearing against the casing of the valve and a head 39 on the free end of the piston rod, respectively.

The inlet valve of one cylinder 6, and the exhaust valve of the next adjacent cylinder 6 are operated from a single shaft 40 journalled in the outer end of a bearing bracket 41 projecting laterally from a wall of one of the cylinders 6.

Such an arrangement is brought about, by providing alternate cylinders 6 with a pair of brackets 41 projecting oppositely from the said cylinders (see Figures 1 and 2).

Each shaft 40 is provided with a pair of relatively spaced cams 42, 43, the heads 29 of the intake piston valves 26 being engaged by the cam 42, and the heads 39 formed on the piston rods of the exhaust piston valves 36 being engaged by a cam 43.

The shafts 40 are driven from the main crank shaft 44 by radially disposed shafts 45. The shafts 45 are arranged in pairs, and at their converging ends are provided with beveled gears meshing with a beveled gear 46 driven from a main gear 47 on the crank shaft 44. At their diverging ends, each shaft 45 of the respective pairs is provided with a gear meshing with a beveled gear 48 provided on an intermediate portion of the shaft 40.

During operation of the engine, explosive charges may be admitted to all of the combustion chambers 12 or to only one combustion chamber 12 of each cylinder at the corresponding end of the cylinder as may be found desired. Means for controlling the supply of fuel to the manifolds 23 and 24 may consist of any suitable means not shown. For example, the fuel may be directed only to the intake manifold 23 and the explosive charges from the intake manifold are admitted to the combustion chambers 12 at the outermost ends of the cylinders 6, by the mechanical opening of the valves 21, and subsequent to compression the charge is ignited by a pair of spark plugs 49' fitted in openings in the outer end of each cylinder 6, there being one spark plug for cylinder chamber 9, and one spark plug for cylinder chamber 10. During the scavenging stroke of the pistons 18 the exhaust valves 32 are mechanically opened by the cams 43 and the products of combustion are permitted to discharge through the exhaust ports 30 to be carried off by the exhaust manifold 34.

The operation is substantially the same when the combustion chamber at the inner end of the cylinders 6 are to be utilized there being provided in the bottom wall of each cylinder 6 a pair of apertures for accommodating spark plugs 49. Each cross head 15 comprises a pair of cross bars 50 bolted together as at 51. At each end thereof, each bar 50 is beveled as at 52 for accommodating therebetween the wedge shaped portion of a rib 14. Inwardly from each beveled end each bar 15 is notched laterally as at 53, opposed notches 53 providing a groove for the head of a rib 14, it being understood that the ribs 14 are substantially T-shaped in cross section.

To each cross head, is pivoted as at 54 the bifurcated end of a pitman 55. As will be apparent from a study of Figure 3, alternate cylinders 6 are offset with respect to the intermediate cylinders, thus providing two groups of cylinders 6, each group consisting of four of such cylinders. The pitmen 55 of one group of cylinders are pivoted as at 56 in an annular series to an annular bearing 57 provided on one crank 58 of the crank shaft 44. The pitmen 55 of the remaining groups include a master pitman connected to the remaining crank 59 of the crank shaft 54 by an integral bearing 60 to which is eccentrically pivoted the remaining three pitmen 55 of said second group, as at 61.

Even though I have herein shown and described the preferred embodiment of the invention, it is to be understood that the same is susceptible of changes, modifications and improvements coming within the scope of the appended claims.

Having thus described my invention, what I claim as new is:

1. An internal combustion engine comprising in combination a plurality of cylinders respectively provided at each end with a combustion chamber, an inlet valve for each combustion chamber on one side of the cylinder, an exhaust valve for each combustion chamber on the opposite side of the cylinder, a rotatably mounted shaft between adjacent cylinders, and means operatively connecting the intake valves of one cylinder and the exhaust valves of a next adjacent cylinder with a shaft arranged between the cylinders.

2. An internal combustion engine comprising in combination a plurality of cylinders respectively provided at each end with a combustion chamber, an inlet valve for each combustion chamber on one side of the cylinder, an exhaust valve for each combustion chamber on the opposite side of the cylinder, a rotatably mounted shaft between adjacent cylinders, and means operatively connecting the intake valves of one cylinder and the exhaust valves of a next adjacent cylinder with a shaft arranged between the cylinders, a crank shaft, and means for transmitting the movement of said crank shaft to each of the first mentioned shafts.

3. An internal combustion engine comprising a plurality of radially disposed cylinders, pistons mounted for reciprocation in the cylinders, each of said cylinders provided at opposite ends with combustion chambers, an intake valve for each combustion chamber on one side of the cylinder, an exhaust valve for each combustion chamber on the opposite side of the cylinder, means operatively connecting the intake valve of one cylinder with the exhaust valve of a next adjacent cylinder, said means including means for simultaneously actuating all of said valves.

4. An internal combustion engine comprising a plurality of cylinders, a crank shaft, pistons reciprocable in the cylinders, a cross heads for the pistons in pairs, guides for the cross heads, a crank shaft, pitmen operatively connecting the crank shaft with said cross head, intake and exhaust valves for each of the cylinders, cam means common to the intake and exhaust valves of adjacent cylinders, and respectively including a shaft, and means for transmitting movement of the crank shaft to the last named shafts.

In testimony whereof I affix my signature.

STEPHEN J. VELTON.